Patented Nov. 17, 1931

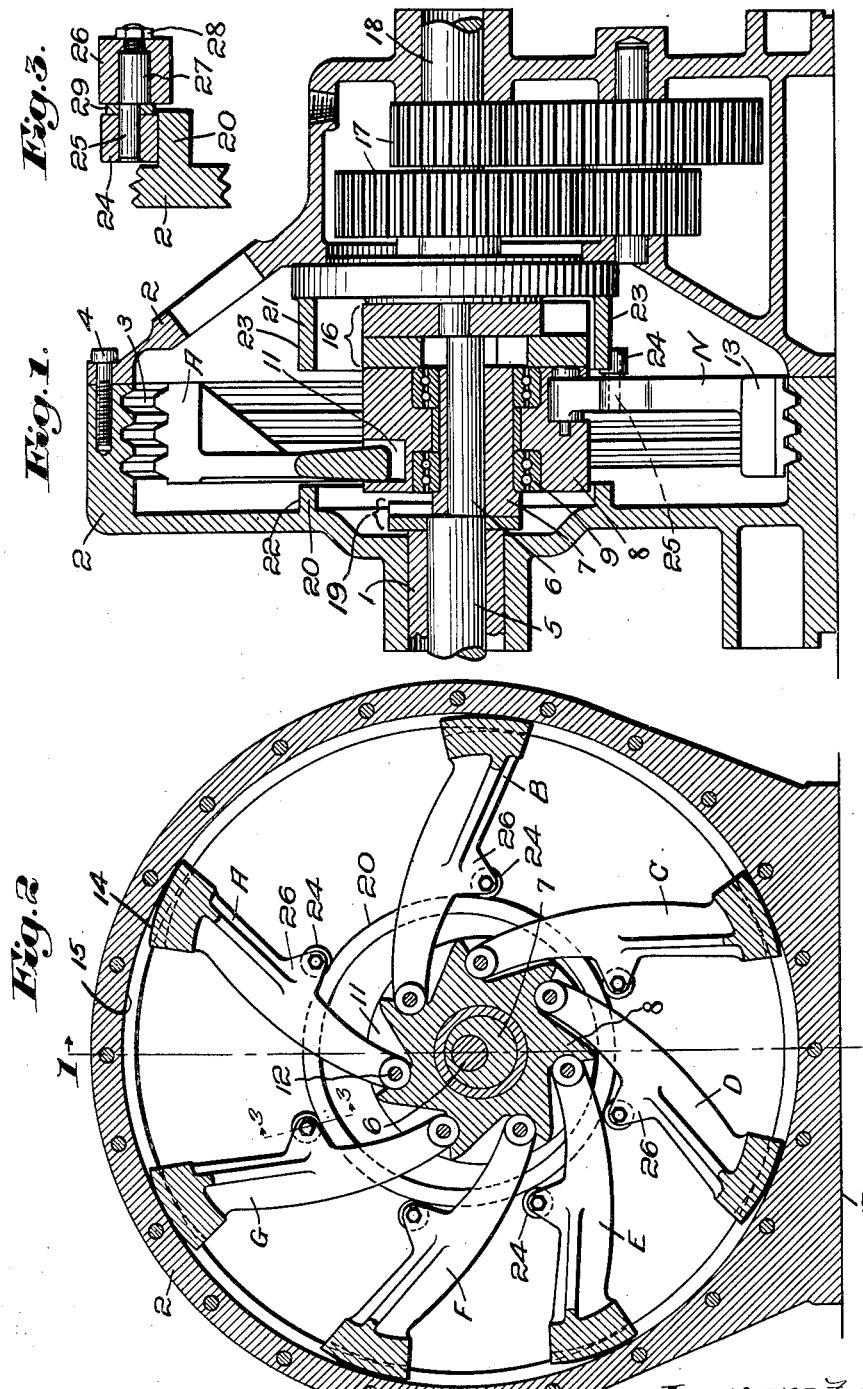

1,832,383

UNITED STATES PATENT OFFICE

BICKNELL HALL, OF ABINGTON, MASSACHUSETTS, ASSIGNOR TO HALL COMPANY, OF BOSTON, MASSACHUSETTS, A CORPORATION OF MASSACHUSETTS

VARIABLE SPEED TRANSMISSION MECHANISM

Application filed January 10, 1923, Serial No. 611,908. Renewed May 5, 1928.

This invention relates to variable speed transmission mechanism. In order that the principle of the invention may be understood, I have disclosed a single embodiment thereof in the accompanying drawings, wherein—

Fig. 1 is a vertical central longitudinal section taken through a portion of a variable speed transmission mechanism and showing my invention applied thereto; the line corresponding to that upon which said section is taken being indicated at 1—1 in Fig. 2;

Fig. 2 is a vertical transverse section through the mechanism shown in Fig. 1 and representing the parts as eccentrically positioned; and Fig. 3 is a detail sectional view upon an enlarged scale taken on the line 3—3 of Fig. 2.

The present invention relates more particularly to a supporting and guiding mechanism for revolving elements which, while in some aspects thereof is adapted for general application, is more especially adapted for use in connection with variable speed transmission mechanism, of that type shown in the copending applications of Bicknell Hall and Edgar F. Hathaway, filed September 11, 1922, Serial No. 587,280 and Serial No. 666,912, filed October 6, 1923.

It is unnecessary to describe at length the variable speed transmission mechanism disclosed in said copending Hall and Hathaway applications. For the purpose of this invention, it is sufficient to set forth that the same includes a main drive shaft partially indicated at 1 as supported within a suitable casing or annular member, a part of which latter is indicated at 2 and desirably having a grooved or other uneven surface 3. Screws 4 are indicated by which the mating portions of the casing may be secured in position. Within the hollow main drive shaft 1 is mounted a shaft 5 having thereon an eccentric portion 6 whereon is mounted an eccentric 7 surrounding which is a gyrator or gyratory member 8 herein supported by ball bearings 9. The said gyratory member 8 may be placed in a concentric relation with respect to the main drive shaft 1, or in an eccentric position with respect to said main drive shaft as indicated in Fig. 2, through turning movement of the shaft 5 in any suitable manner not herein necessary to describe.

The gyratory member 8 carries a series of driving units or arms, abutment members or pushers. Said arms or members are herein shown as pivoted upon the gyratory member 8 which for this purpose is here shown as having a series of peripheral recesses 11 within which at 12 are pivotally secured the several arms A to N inclusive, said arms being desirably arranged in two series of seven each, in the present disclosure as apparent in Fig. 1. One series only of said arms, namely those lettered A–G, is shown in Fig. 2 for the sake of clearness. Obviously the number of said arms may be widely varied inasmuch as the principle of my invention is applicable to a structure wherein any suitable plurality of arms or like members is provided. Each of said arms A to N inclusive is provided with a head 13 having a preferably arcuate surface 14 eccentrically formed with respect to the inner annular surface 15 of the casing member 2. Said heads 13 desirably are grooved as indicated in Fig. 1 to conform to the shape of the inner surface of the casing 2.

Each of said arms is adapted periodically to act as a strut or abutment positively to engage the surface 15 of the casing and consequently upon the gyratory movement of the ring 8 to impose a movement of rotation upon said gyratory member which by reason of a unison ring 16 and suitable gearing 17 represented in Fig. 1, or by other means, is conveyed to the ultimate driven element 18, it being noted that said eccentric is driven from the main drive shaft 1 by reason of a similar unison ring 19.

The heads of all of the arms are constantly in engagement with the inner surface 15 of the casing 2, but in the disclosed example only a relatively small plurality of said arms acts as driving members at a time, all the other arms at that instant of time having a slipping and rolling action with respect to said surface 15. Each impulse of rotation imposed by any one arm is supplemented by a like impulse of rotation by the next arm, a series of the arms functioning in what may be termed an overlapping relation, so that the gyratory member 8 is rotated at a uniform speed in a contra-clockwise direction viewing Fig. 2, whatever be the direction of rotation of the main drive shaft 1 and whether the same be rotated or oscillated, as more fully set forth in said co-pending applications of Hall and Hathaway.

At any given instant of time only a relatively small number of arms are active as struts, abutments or driving members. It is desirable that means be provided to maintain the heads of said arms and also the heads of the other arms against or closely adjacent to the concentric stationary surface 15. For that purpose I preferably provide a relatively stationary guide or support for each series of arms and herein shown as the annular members 20 and 21 fixed upon the opposite inner walls of the casing 2 and concentrically positioned with respect to the drive shaft 1. Said guides while illustrated as integrally formed with the respective mating portions of said casing, may be otherwise constructed or arranged or may be formed as a floating ring or rings as shown, for example, in said co-pending application of Hall and Hathaway Serial No. 587,280.

Each of the arms A–N inclusive herein carries a roller adapted to rest upon and travel over the outer annular surfaces 22, 23 of the respective guides 20 and 21. Said rollers, indicated at 24 in Figs. 1, 2 and 3 are rotatably supported upon pins 25 extending laterally from lugs or projections 26 formed upon the respective arms.

The formation of said rollers 24 and of the said lugs 26 is desirably such that the axis of each roller coincides with the center from which the arcuate surface 14 of the head 13 of the arm carrying said roller is struck. In this manner each driving arm as it moves about with the gyrator 8 is permitted to have a rolling or swinging movement about its roller 24 as a center, the arcuate surface of its head rolling as well as slipping upon the inner surface 15 of the casing. At the same time each arm being constantly in contact through its roller with a guide 20 or 21 is supported and maintained in proper functioning relation with the surface 15 of the casing and prevented from slipping down or away therefrom, the same being accomplished positively, that is, entirely without the use of springs or like devices.

Desirably I provide means for varying the position of the rollers 24 with respect to their arms thereby to adjust the said arms to care for wear of the parts after a period of long use, or for any other reason.

For this purpose herein as best seen in Fig. 3 I provide each pin 25 with an eccentric portion 27 near the inner end thereof and seated with an annular recess formed in the lug 26 of each arm. The inner extremity of each of said pins is preferably screw threaded to receive a nut 28 whereby said pins are held in fixed relation to the lugs 26. By loosening said nuts 28 the eccentric portions 27 may be turned within the lugs thereby varying the position of the pins 25 and rollers 24 carried thereby. Said rollers desirably are spaced from their respective lugs 26 as by the washers 29, one of which is indicated in Fig. 3.

It will be observed that the annular guides and rollers cause a uniform action of all of the various arms of the series and hold the heads thereof in contact with the concentric surface 15 where they function either to roll or slide or to act as driving members as already set forth.

Having thus described my invention I desire it to be understood that I am not limited to the particular illustrative embodiment shown herein the scope of the invention being set forth in the following claims:

1. In a transmission mechanism, a driving element, a driven element, and operative connections between them including an eccentric connected to the driving element, a gyrator carried thereby connected to the driven element, a casing constituting an abutment, a series of driving arms or abutment-engaging members between said gyrator and said casing movably attached to one of said parts and having driving contact with the other to impart rotative movement to said gyrator, and an annular guide positively to maintain said arms in functioning relation.

2. In a transmission mechanism, a driving element, a driven element, and operative connections between them including an eccentric connected to the driving element, a gyrator carried thereby connected to the driven element, a casing constituting an abutment, a series of driving arms or abutment-engaging members between said gyrator and said casing, movably attached to one of said parts and having driving contact with the other to impart rotative movement to said gyrator, guiding means for said arms, and rollers upon said arms cooperating therewith.

3. In a transmission mechanism, a driving element, a driven element, and operative connections between them including an eccentric connected to the driving element, a gyrator carried thereby connected to the driven element, a casing constituting an abutment, a series of driving arms or abutment-engaging members between said gyrator and said casing, movably attached to one of said parts and having driving contact with the other to impart rotative movement to said gyrator, a guide having an annular surface concentric with said driving element, and means upon said arms cooperating therewith.

4. In a transmission mechanism, a driving element, a driven element, and operative connections between them including an eccentric connected to the driving element, a gyrator carried thereby connected to the driven element, a casing constituting an abutment, a series of driving arms or abutment-engaging members between said gyrator and said casing, movably attached to one of said parts and having driving contact with the other to impart rotative movement to said gyrator, guide means concentric with said driven element and a roller upon each of said arms cooperating therewith to maintain said arms in functioning relation.

5. In a transmission mechanism, a driving element, a driven element, and operative connections between them including an eccentric connected to the driving element, a gyrator carried thereby connected to the driven element, a casing constituting an abutment, a series of driving arms or abutment-engaging members pivoted to said gyrator and having driving contact with said casing abutment, guiding means, and means upon said arms having positive engagement therewith to cause said arms to function uniformly.

6. In a transmission mechanism, a driving element, a driven element, and operative connections between them including an eccentric connected to the driving element, a gyrator carried thereby connected to the driven element, a casing constituting an abutment, a series of driving arms or abutment-engaging members pivoted to said gyrator and having driving contact with said casing abutment, an axially fixed annular guide concentric with said abutment element, a roller upon each of said arms and cooperating with said guide to maintain said arms in functioning relation, and means for adjusting the position of said rollers.

7. In a transmission mechanism, a driving element, a driven element, and operative connections between them including an eccentric connected to the driving element, a gyrator carried thereby connected to the driven element, a casing constituting an abutment, a series of driving arms or abutment-engaging members between said gyrator and said casing, movably attached to one of said parts and having driving contact with the other to impart rotative movement to said gyrator, guiding means for said arms, rollers upon said arms cooperating therewith, and means to adjust said rollers.

8. In a transmission mechanism, a driving element, a driven element, and operative connections between them including an eccentric connected to the driving element, a gyrator carried thereby connected to the driven element, a casing constituting an abutment, a series of driving arms or abutment-engaging members pivoted to said gyrator and having driving contact with said casing abutment, and positive means intermediate the ends of the arms to maintain them in functioning relation.

In testimony whereof, I have signed my name to this specification.

BICKNELL HALL.